United States Patent [19]

King

[11] Patent Number: 5,155,892
[45] Date of Patent: Oct. 20, 1992

[54] HYDRAULIC CYLINDER ASSEMBLY PROCESS AND MACHINE

[76] Inventor: Jeffrey R. King, 13041 Wedel, Trufant, Mich. 49347

[21] Appl. No.: 648,286

[22] Filed: Jan. 31, 1991

[51] Int. Cl.⁵ ............................................. B23P 11/00
[52] U.S. Cl. ...................................... 29/434; 29/525; 29/773; 29/778; 29/809
[58] Field of Search ...................... 29/888.06, 888.042, 29/888.044, 809, 773, 778, 434, 525

[56] References Cited

U.S. PATENT DOCUMENTS

| | | | |
|---|---|---|---|
| 2,997,026 | 8/1961 | Zimmerer | 29/434 |
| 3,967,363 | 7/1976 | Meyer | 29/434 |
| 3,994,059 | 11/1976 | Watson | 29/773 X |
| 4,115,913 | 9/1978 | Moriya et al. | 29/773 X |
| 4,190,940 | 3/1980 | Lawrence | 29/434 X |
| 4,330,926 | 5/1982 | McCall | 29/434 X |
| 4,794,685 | 1/1989 | Hillier | 29/434 X |
| 4,870,748 | 10/1989 | Hensgen et al. | 29/773 |
| 5,016,346 | 5/1991 | Gerst et al. | 29/809 X |

FOREIGN PATENT DOCUMENTS

| | | | |
|---|---|---|---|
| 0102440 | 8/1981 | Japan | 29/809 |
| 0156136 | 9/1982 | Japan | 29/809 |
| 0120436 | 7/1983 | Japan | 29/809 |

Primary Examiner—Timothy V. Eley
Assistant Examiner—C. Richard Martin
Attorney, Agent, or Firm—Waters & Morse

[57] ABSTRACT

Hydraulic cylinders each comprising a hollow cylinder casing, a ram, and an annular seal are assembled automatically by a mechanism that stores and feeds seals, ram and casing members into separated axial alignment and then axially moves the components together until they are assembled. A tapered mandrel protects the inner surface of the seal from abrasion as it is fitted over the end of the ram, and a tubular insert with collapsing finges guides the ram and protects the seal from abrasion by the end of the casing as the ram is fitted into the casing. An automatic cap threading machine threads a cap in the open end of the casing after the push rod has been assembled in the casing. Retractable support means are provided for certain of the components in order to permit an assembly mechanism to fit over the components and move them along an axial path.

9 Claims, 5 Drawing Sheets

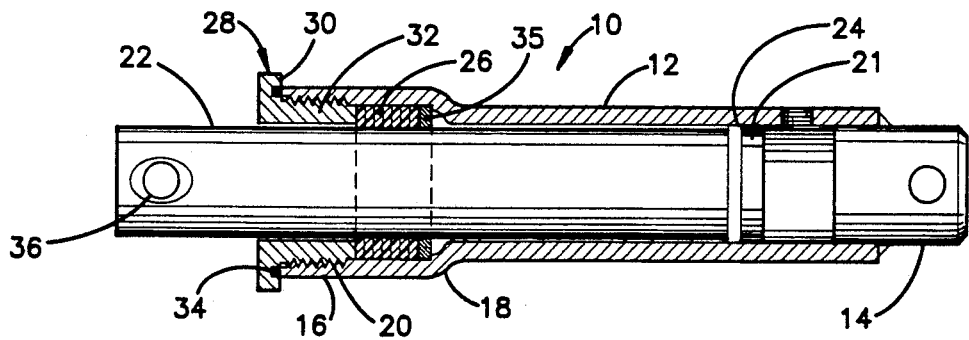
FIG. 2
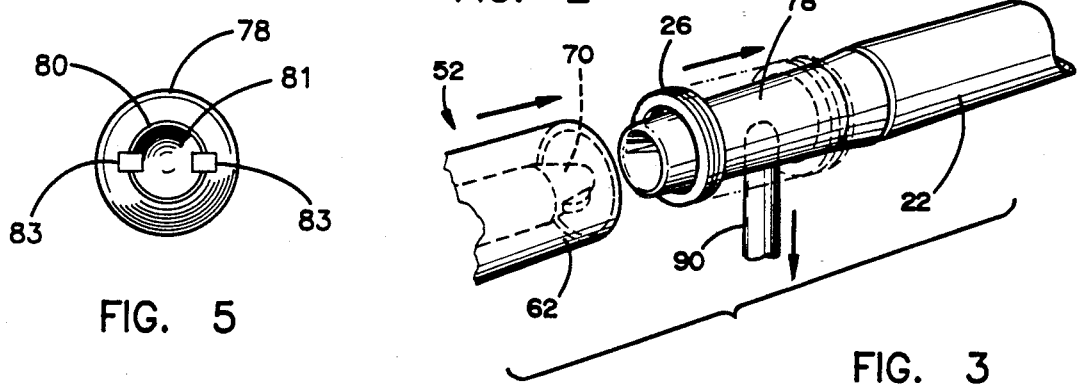
FIG. 5
FIG. 3
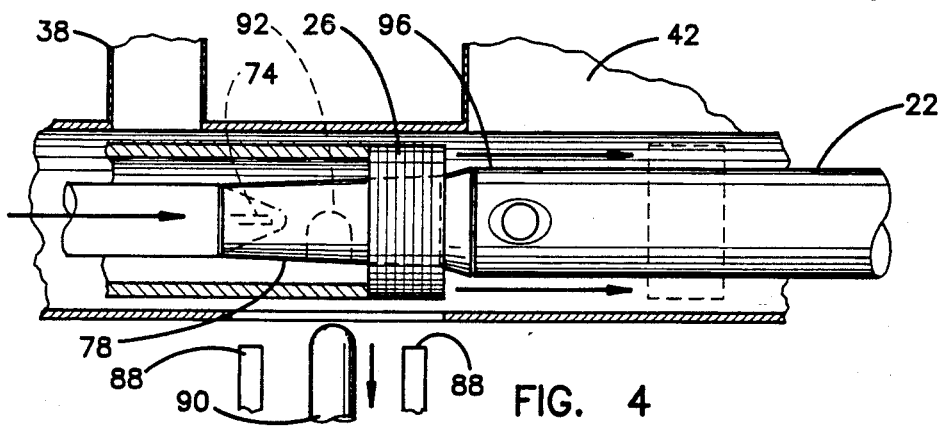
FIG. 4
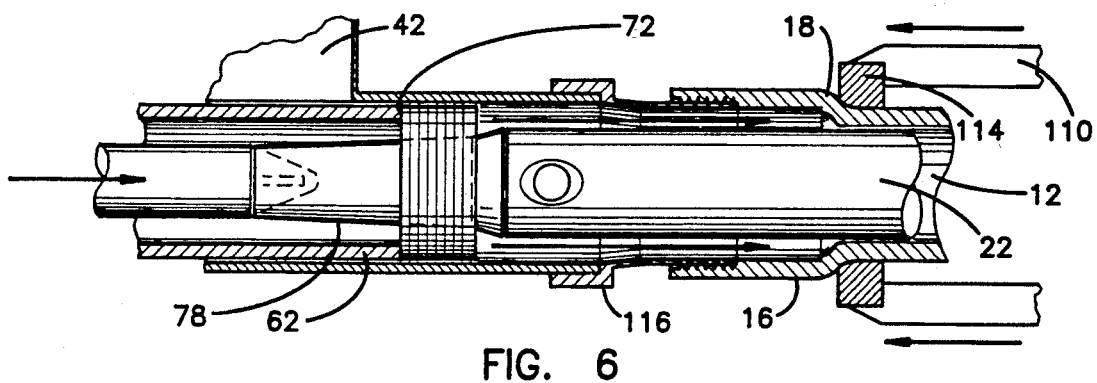
FIG. 6

HYDRAULIC CYLINDER ASSEMBLY PROCESS AND MACHINE

BACKGROUND OF THE INVENTION

This invention relates to a machine and process for automatically assembling hydraulic cylinders.

A hydraulic cylinder includes a hollow outer sleeve or cylinder casing, a piston or ram that fits in the cylinder casing and seals mounted on the ram that seal the space between the cylinder casing and the ram at the open end of the casing. A cap is screwed on the end.

A conventional way of assembling such cylinders is by hand, with the seals being fitted on the ram by hand and then the ram being inserted in the casing by hand. The cap is then screwed on the top of the casing, also by hand. This is a labor intensive and very expensive process, but seems to be the only process that is used for relatively heavy duty cylinders.

The object of the present invention is to provide an improved automatic assembly machine and process for assembling such cylinders without extensive manual operations and without damaging the fragile seals necessary to maintain the pressure within the cylinder.

SUMMARY OF THE INVENTION

In accordance with the present invention, apparatus for assembling fluid operated cylinders that comprise a hollow cylinder casing, a ram, and an annular seal comprises a storage mechanism for separately storing the seals, ram, and casings and feeding them one by one into axial alignment in a line of assembly; axial supports that hold at least temporarily each seal, ram and casing in the line of assembly; an assembly mechanism that moves the components axially to assemble the seal, ram and casing together, the assembly mechanism first inserting the ram into the casing and then fitting the seal on the ram; an inner seal protection mechanism for protecting the inner surface of the seal when it is fitted on the end of the ram, the seal protection mechanism comprising a tapered mandrel that abuts the end of the ram, the seal being forced over the mandrel and sliding on the end of the ram without engagement with sharp outer edges on the end of the ram; an outer seal protection mechanism for protecting the outer surfaces of the seal from abrasion by the outer edge or any internal threads in an outer end of the casing, the outer seal protection mechanism comprising a tubular insert having outwardly extending movable fingers that fit into the outer end of the casing over any threads or grooves with a radially extending outwardly extending portion being positioned outside of the casing, the seal fitting through the outer seal protection mechanism as it is mounted on the ram in the casing.

In the preferred invention, the ram support can retract out of supporting engagement with the ram as the assembly mechanism moves the ram into the casing.

The mandrel also is preferably mounted on a movable mounting mechanism that retracts as the assembly mechanism forces the seal over the mandrel, the assembly mechanism supporting the mandrel in alignment with the ram after the mandrel support mechanism has retracted.

In another aspect of the invention, after the ram and seal have been assembled in the casing, a threaded cap is automatically threaded on the casing by an automatic cap insertion mechanism.

The assembly process performed by the apparatus of the present invention constitutes an aspect of the present invention.

The present invention makes it possible to eliminate virtually all of the extensive hand labor that is currently being used to assemble hydraulic cylinders and makes it possible to assemble hydraulic cylinders quickly and efficiently by using completely automated means.

These and other features and advantages of the present invention will become apparent from the following description of the preferred embodiments of the invention.

BRIEF DESCRIPTION OF THE DRAWINGS

FIG. 2 is a sectional view showing the assembled cylinder.

FIG. 3 is a fragmentary perspective view showing the mandrel mechanism used for fitting the seals on the end of the ram.

FIG. 4 is a sectional view of the mandrel mechanism.

FIG. 5 is an end view of the mandrel.

FIG. 6 is a sectional view showing the insertion of the ram into the cylinder casing.

BRIEF DESCRIPTION OF THE PREFERRED EMBODIMENTS

Figure 1:
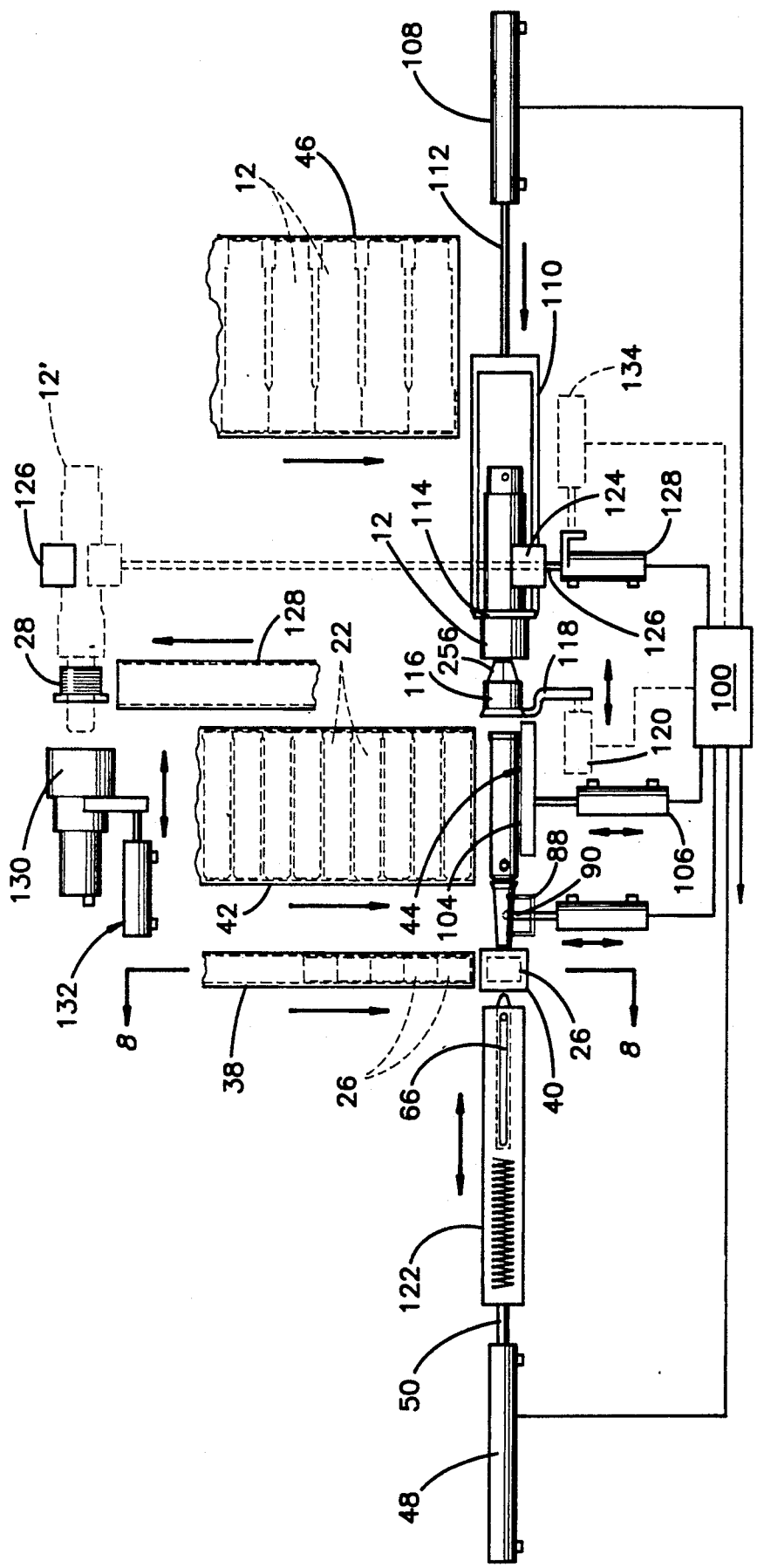
FIG. 1 is a side elevational view of an automatic assembly machine embodying the present invention.

Referring to the drawings, an assembled hydraulic cylinder 10 is shown in FIG. 2. This assembly includes an outer sleeve or hollow cylinder casing 12 having a closed end 14 and an open end 16. The open end is expanded outwardly at 18 and includes internal threads 20. A ram 22 fits closely within the interior of casing 12. Ram 22 has a ridge 21 around an inner end 23, with a washer 24 welded to the ram against the ridge. A seal assembly 26 fits on the ram at the opposite end of the casing and seals the space between the outer periphery of the ram and the inner surface of the casing. A threaded cap 28 has an outer flange 30 that fits over the end 16 of casing 12 and an externally threaded inner sleeve 32 that mates with thread 20 on the casing. An O-ring seal 34 or the like fits in an internal groove in the inside of cap 28 to seal the space between the cap and the ram. The ram may have an opening 36 at an outer end for attachment to a suitable drive mechanism. The cap clamps and compresses the seal assembler in the outwardly flared outer end 16 of the casing, with the inner end of the seal assembly bearing against a washer 35, which can be included in the seal assembly.

Figure 7:
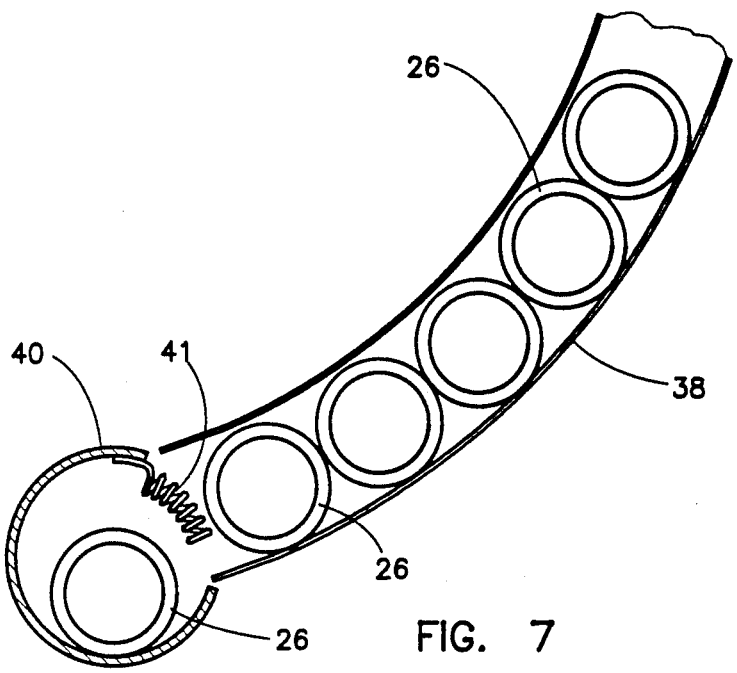
FIG. 7 is a sectional view taken along line 8—8 of FIG. 1.

Automatic assembly of this hydraulic cylinder mechanism is accomplished by the process and apparatus disclosed in FIG. 1. Seals 26 are stored in racks or magazines 38 positioned above the seal location. One seal is held in position by a curved retainer 40, shown in more detail in FIG. 7. A spring 41 holds the remaining seals in the magazine while one seal is in the retainer. A plurality of rams 22 are similarly held for gravity feed in a magazine 42 above a movable support cradle 44 that retains one ram in axial alignment with seal 26 as it rests on retainer 40.

A plurality of cylinders 12 are held in a similar magazine 46 for vertically feeding the lower-most cylinder 12 into a position in axial alignment with the seal and ram. The illustration in FIG. 1 shows the lower-most cylinder at a position in the assembly process after it has been moved to the left (FIG. 1 orientation).

The foregoing apparatus is designed to position the seal mechanism, ram, and cylinder mechanism all in axial alignment for assembly of the three components together in a single assembly step, using automatic assembly machinery. The automatic assembly mechanism comprises a double action cylinder 48 positioned adjacent the seal feed mechanism. The cylinder has an output shaft 50 that is connected to a seal pusher mechanism 52, shown in detail in FIG. 8.

Seal pusher 52 (described in detail below) first pushes the seal on the mandrel, then pushes the ram into the cylinder, and finally pushes the seal assembly on the ram. The drive cylinder 48 then retracts the seal pusher mechanism for assembly of the next cylinder.

Figure 8:
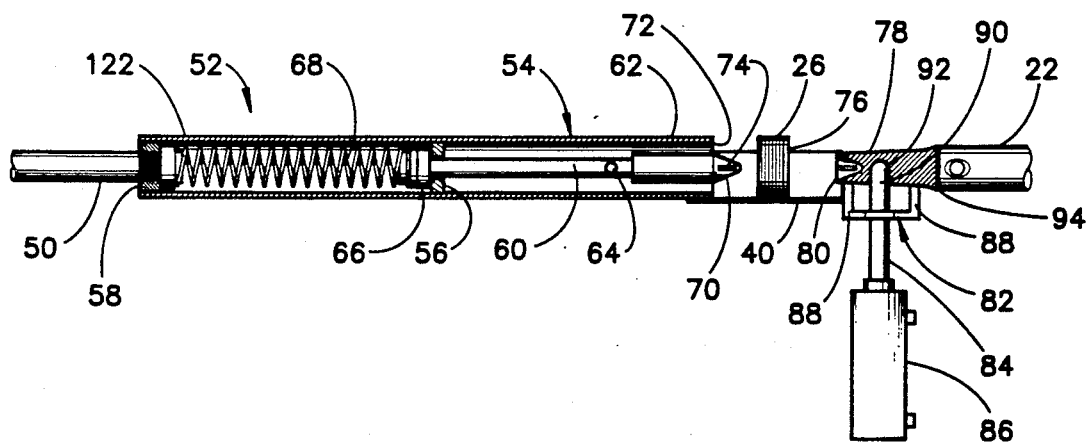
FIG. 8 is a side elevational cross sectional view of the seal pusher and mandrel mechanism of the present invention.

As shown in FIG. 8 seal pusher 52 comprises a tubular outer housing 54 and a center dividing plate 56. Rod 50 can be attached to a closed end 58 of the tube pusher or can be attached by other means. A rod 60 is longitudinally and slidably mounted in a forward section 62 of the housing. Rod 60 has flanges 64 extending outwardly therefrom that ride in slots 66 (FIG. 1) so as to hold the rod in an axially aligned position in the seal pusher. Rod 60 fits through an opening in plate 56 and has a flanged end 66 on the left hand side of the plate. The flanged end rides against a spring 68 that resiliently urges the rod toward its outwardly extended position (shown in FIG. 8). The front end of the rod is fitted with a tapered nose 70 that protrudes beyond the outer end 72 of the tubular housing 54. As shown in FIGS. 3 and 4, nose 70 has flanges 74 extending outwardly from the sides thereof. Cylindrical housing 54 fits inside retainer 40 so that when it is extended it comes in contact with seal assembly 26. The outer diameter of the end of the housing is such that it engages the seal and pushes it to the right as the push rod 50 is extended.

As shown in FIG. 8, as seal pusher 52 is moved to the right, nose 70 first fits through opening 76 in the seal. This causes the seal to stay firmly on the seal pusher as the seal is pushed to the right. Ultimately end 72 of the seal pusher engages the seal and pushes it over a mandrel 78 and then on to ram 22.

The purpose of mandrel 78 is to align the seal with the rod and prevent seal 26 from being damaged by sharp corners on the outer end of ram 22. The mandrel can be eliminated if the outer end of the ram is beveled or otherwise does not have sharp edges. The mandrel has an outer end 80 of smaller diameter that fits easily within opening 76 of the seal. End 80 has a concave recess 81 therein that mates with nose 70 on the push rod and has slots 83 in the recess that fit and non-rotatingly engage the flanges 74 on the push rod.

Mandrel 78 is held in axial alignment with seal 26 by a removable cradle assembly 82, which is mounted on the output shaft 84 of a cylinder 86. Cylinder 86 can raise and lower the cradle assembly into and out of supporting engagement with the mandrel. The cradle assembly includes a pair of spaced arms 88 that partially encircle and support the mandrel. A stop member 90 fits into a mating opening 92 in the side of the mandrel and prevents the mandrel from moving axially. Arms 88 merely hold the mandrel in proper vertical alignment.

Mandrel 78 has an enlarged end 94 that abuts the outer end 96 of ram 22, which could have a bevelled edge (as shown in FIG. 1) or a flat surface (as shown in FIG. 4) or a stepped surface. In either case, the adjacent end of the mandrel is flared outwardly in order to cover the sharp outer edges of the ram. As shown in FIG. 4, seal pusher 52 pushes the seal over the mandrel and over the sharp edges at end of the ram and onto the ram, without damaging the seal. As the seal pusher pushes the seals, the mandrel support mechanism retracts in the manner shown in FIG. 4 so that the seal pusher can push over the mandrel without engaging the mandrel support mechanism. A control means 100 controls the various operations so that the mandrel is supported until the nose of the seal pusher is embedded in the end of the mandrel and the mandrel is supported by the seal pusher. At that point, the mandrel support mechanism is retracted. As the seal pusher extends, nose 70 remains in a fixed position on the mandrel, and rod 60 retracts in the seal pusher, against the force of spring 68.

As the seal pusher presses against the mandrel and the seal, the mandrel in turn pushes the ram to the right.

As shown in FIG. 1, the ram is held in place by means of a ram holder 44 that supports the underside of the ram by means of a lower portion 104 on the holder. The support mechanism can be raised and lowered by means of a double acting cylinder 106 to move the support out of the way when the seal pusher pushes the ram to the right. Desirably all of the cylinders are operated pneumatically.

The seal pusher continues to push the mandrel and the ram to the right, until the ram becomes inserted into the interior of cylinder casing 12. Cylinder casing 12, after it has been placed in axial alignment with the other elements, is moved to the left by a double acting cylinder 108 which has a sleeve 110 mounted on the end of output shaft 112. A collar 114 on the end of sleeve 110 engages the flared portion 18 of the cylinder casing and moves it to the left when the cylinder 108 is extended. This pushes the cylinder casing into proper mounting position, as shown in FIG. 1.

Figure 11:
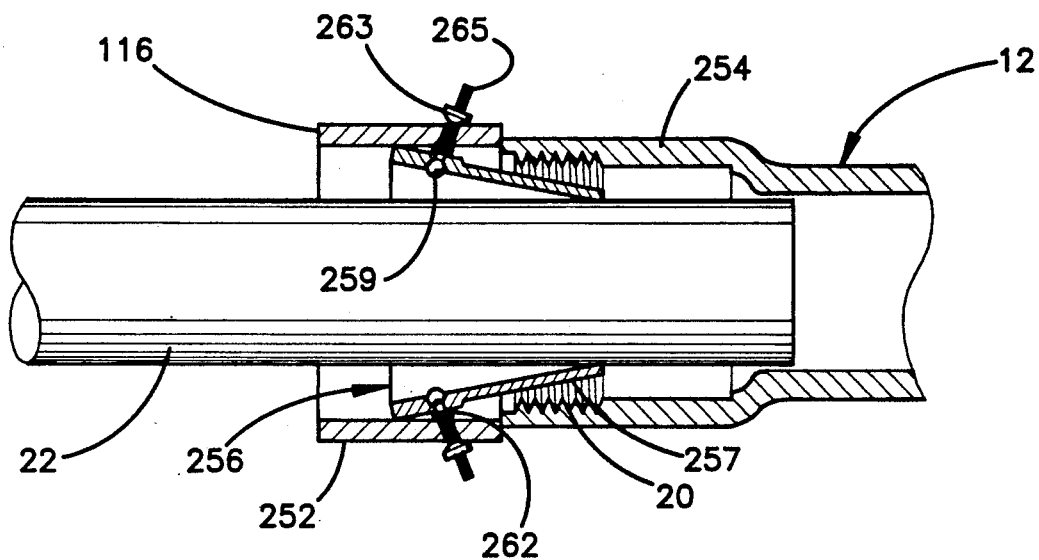
FIG. 11 is a sectional view of the outer seal protection mechanism, showing the ram extending through the seal protection fingers.
Figure 12:
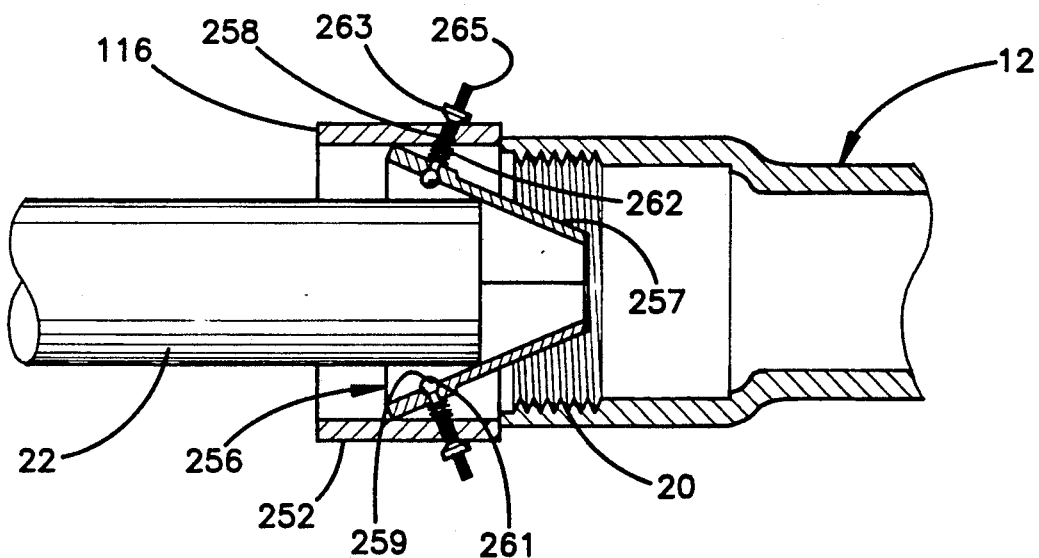
FIG. 12 is a section view as in FIG. 11, showing the ram withdrawn from the seal protection fingers.

Interposed between the cylinder casing and the push rod is a flared tubular seal protector 116, shown in detail in FIGS. 11 and 12. The seal protector is inserted in the threaded outer end of the cylinder and covers the threads. The seal fits inside the seal protector as it slides on the ram, avoiding damage to the seal by the sharp threads on the interior surface of the cylinder. This operation is shown in FIG. 6.

Seal protector 116 may be held in a fixed position by means of a support member 118 (shown schematically in FIG. 1). The seal protector may be inserted in the cylinder casing by one of two ways. Either the cylinder casing may be moved further to the left by means of drive cylinder 108, or the seal protector may be moved to the right by means of a drive cylinder 120, which is connected to the support 118 for the seal protector. In either case, once the seal protector is inserted in the exterior of the cylinder 12, the seal pusher is further extended to push the ram into the cylinder and then push the seal on the ram.

As shown in FIGS. 11 and 12, seal protector 116 comprises a tubular housing 252 that abuts the end of cylinder casing 12. A collapsing conical liner 256 formed of separate radially spaced sections 257 is mounted in the interior of housing 252 and extends inwardly over threads 20 in an outer portion 254 of housing 252 of enlarged diameter. Each section is connected to the housing by a pin or shaft 258 having a rounded head 259 at one end bearing against and recessed completely in a rounded socket on the inner side of the section, and having a threaded end 265 extending through an opening in the section into threaded engagement with a nut 263 on the outer side of the housing. A coil compression spring 262 fits on the shaft and exerts an inward force on section 257, urging the cone to the collapsed position.

As shown in FIGS. 11 and 12, the collapsing cone has a normal collapsed position shown in FIG. 12. This guides the ram to a centered position with respect to the cylinder casing. As the ram is moved into the casing the cone expands as in FIG. 11 to let the ram pass through.

After the components have been assembled in the above manner, the seal pusher is withdrawn to its original position and the thread protector and mandrel are returned to their original positions, with the respective support mechanisms first being moved out of the way and then being moved into support positions as the components are returned to their original positions. While the seal pusher is extending, a rear portion 122 of the seal pusher prevents additional seals and push rods from dropping into a loading position behind the extended seal pusher.

At this point, the assembled hydraulic cylinder is moved to the next stage, wherein the threaded cap is put on the cylinder. This can be accomplished in one of several ways. As shown in FIG. 1, when sleeve 110 is retracted, a support cradle 124 mounted on the output shaft 126 of an extendable cylinder 128 is extended into supporting engagement with the hydraulic cylinder assembly. The cradle is then moved vertically to the position of assembly 12' (shown in phantom) in FIG. 1. At this point an opposed clamping block 126 is engaged and the cylinder is clamped between blocks 126 and cradle 124 in a nonrotating manner. A threaded cap 28 is then fed downwardly through a magazine 128 into axial alignment with the threaded open end of the cylinder, and an automatic cap threading device 130 is extended by cylinder 132 into engagement with the cap. This device rotates the cap until it becomes firmly seated in the cylinder. At this point, the cylinder is removed from the apparatus for packaging and shipment.

As an alternative to the extension of cylinder 128 until it engages block 126, cradle 124 and block 126 could comprise an openable clamp that clamps the cylinder at the location of cradle 124 in FIG. 1. Then the clamped cylinder assembly could be moved to alignment with the cap threading machine. With the cylinder clamped before movement, the cylinder can be moved in any direction and not simply a vertical direction.

As another alternative, an automatic arm moving device 134 can be attached to cylinder 128 so as to move the entire cylinder to another position wherein the cylinder will be in axial alignment with cap threader 130. Arm mover 134 could rotate cylinder 128, for example, so that the assembled hydraulic cylinder is out of alignment with the cylinder assembly mechanism and is placed into alignment with the cap threader.

Figure 9:
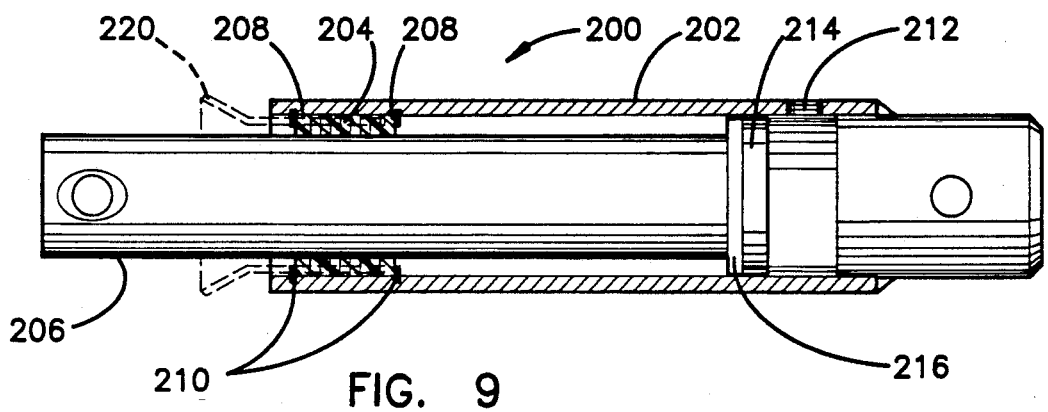
FIG. 9 is a sectional view of a modified single action cylinder assembled with the present invention.
Figure 10:
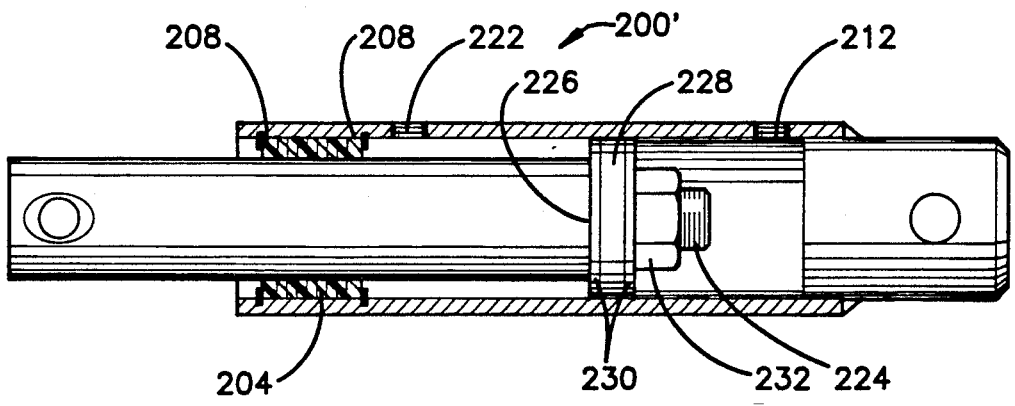
FIG. 10 is a sectional view of a double action cylinder assembled with the present invention.

Two alternative cylinder configurations are shown in FIGS. 9 and 10. In FIG. 9, a single acting cylinder 200 has a cylindrical outer casing 202 without a flared outer end. Instead a seal assembly, 204 is held on a ram 206 at the outer end of the casing by means of spring metal clips 208 that fit into grooves 210 in the interior of the casing. This cylinder is a single acting cylinder with a single port 212 at the inner end. The ram has a flared inner end 214 and a washer 216 welded to the ram adjacent the end, as in the previous embodiment.

This cylinder is assembled in a similar manner as the previous cylinder except that the cap does not need to be threaded on. Instead the clips 208 can be mounted with the seal assembly, and the thread protector 220 guides the clips and seal over grooves 208 into the end of the casing. The thread protector (shown in phantom) fits in the end of the casing past the ring grooves so the inner end of the ram will slide past the grooves. The seal protector can then be withdrawn slightly to expose the inner groove, so that the inner clips will slide inwardly to the inner groove, where the clip will engage the grooves and limit further movement.

Another version of the FIG. 9 cylinder is shown in FIG. 10 as a double acting cylinder 200' having a second port 222. The rest of the components are the same, except that ram 206 has a threaded inner end 224 of narrower diameter, forming a shoulder 226 on the ram. A seal 228 sandwiched between two washers 230 is compressed in place against the shoulder by a nut 232 threaded on the end 224. This provides an enhanced seal between the ports. This device is assembled in the same manner as the device of FIG. 9. In both cases the clip and seal on the inner end of the ram can be preassembled before the ram is placed in the magazine.

The foregoing embodiments are merely exemplary of the present invention, with the scope of the invention being limited only by the appended claims.

I claim:

1. Apparatus for automatically assembling fluid operated cylinders that comprise a hollow cylinder casing member, a ram member axially mounted in the cylinder casing and an annular seal member mounted on the ram, the apparatus comprising:

means for separately storing the seals, rams and casing members in side by side orientation and feeding them one by one into axial alignment in a line assembly;

axial support means for holding at least 10 temporarily each seal, ram, and casing member in separate axial alignment in the line of assembly; and assembly means for moving the members axially together such that the seal member ram member, and the casing member are fitted together, with the seal member fitting co-axially over the ram member and the ram member and seal member fitting co-axially into the casing member.

2. Apparatus according to claim 1 and further comprising:

inner seal protection means for protecting the inner surface of the seal from abrasion on the end of the ram when the seal is fitted over the ram, said means comprising a tapered mandrel that abuts the end of the ram, the assembly means forcing the seal axially over the mandrel and on to the ram.

3. Apparatus according to claim 1 and further comprising:

outer seal protection means for protecting the outer surfaces of the seal from abrasion by the outer edge or any internal threads or edges in an outer end of the casing, said means comprising a tubular insert that fits into the outer end of the casing so as to cover the threads or sharp edges, the insert having a radially outwardly extending portion outside of the casing, said means including means for positioning the insert in the end of the casing, the assembly means fitting the ram into the end of the casing through the insert and sliding the seal on the ram inside the outer seal protector, said outer seal protection means further including means for removing the seal protection means from the casing after cylinder assembly.

4. Apparatus according to claim 3 wherein the outer seal protection means comprises a plurality of inwardly extending fingers pivotally mounted on the outwardly extending portion so as to form a collapsing cone, the cone being spring biased inwardly.

5. Apparatus according to claim 1 wherein the axial support means for the ram member retracts out of the way when the assembly means pushes the ram member off of the support means, the assembly means first engaging and supporting the push rod member and then the support means retracting out of supporting engagement.

6. Apparatus according to claim 1 wherein the mandrel is supported on a retractable cradle that withdraws from supporting engagement with the mandrel as the assembly means forces the seal over the mandrel, the assembly means supporting the mandrel when the cradle retracts.

7. Apparatus according to claim 1 and further comprising automatic cap insertion means for threading a cap in a threaded end of the casing after insertion of the push rod in the casing.

8. A process for automatically assembling fluid operated cylinders that comprise a hollow cylinder casing member, a ram member axially mounted in the cylinder casing and an annular seal member mounted on the ram, the process comprising:
 separately storing the seals, rams and casing members and feeding them one by one into axial alignment in a line of assembly;
 holding at least temporarily each seal, ram, and casing member in separated axial alignment in the line of assembly;
 moving the members axially together such that the seal member, ram member, and casing member are assembled together;
 protecting the inner surface of the seal member from abrasion on the end of the ram when the seal is fitted over the ram by means of a tapered mandrel that abuts the end of the ram, the seal being forced axially over the mandrel and on to the ram; and
 protecting the outer surfaces of the seal from abrasion by the outer edge or any internal threads or sharp edges in an outer end of the casing by means of a tubular insert that fits into the outer end of the casing and has a radially outwardly extending portion outside of the casing, the insert being positioned in the end of the casing and the seal being inserted into the end of the casing through the insert and being slid into a fully inserted position on the ram.

9. A process according to claim 8 and further comprising threading a cap in a threaded end of the casing after insertion of the push rod in the casing by means of an automatic cap threading mechanism.

* * * * *